Feb. 10, 1925.
J. W. SMITH
STOCK WATERER
Filed Dec. 6, 1923
1,526,249
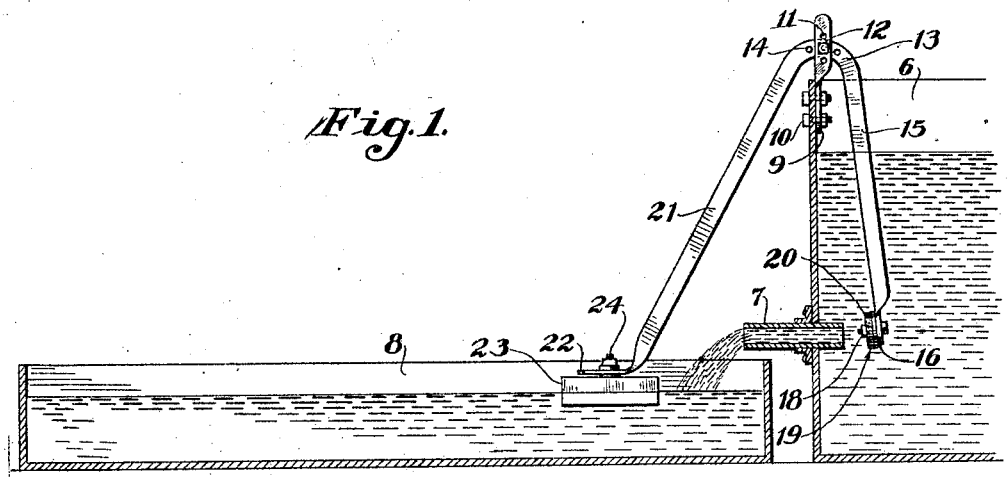
Fig.1.
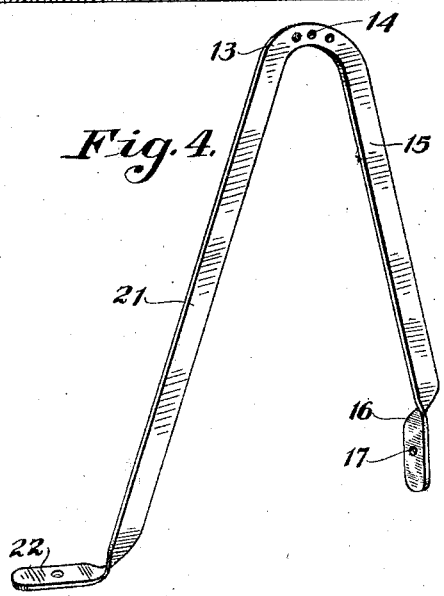
Fig.4.
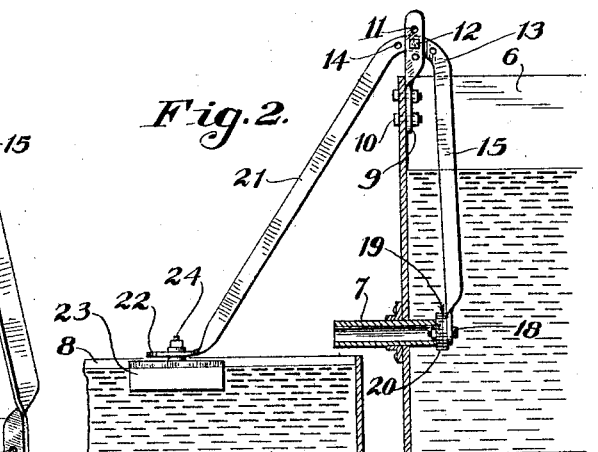
Fig.2.
Fig.3.
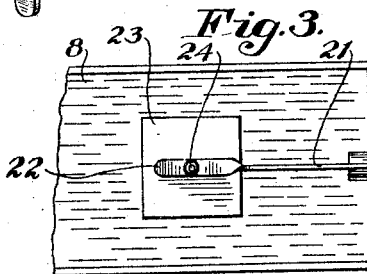
Fig.5.
WITNESSES
Louis Goodman
E. N. Lovewell
INVENTOR
J. Worley Smith
BY
ATTORNEY Patented Feb. 10, 1925.

1,526,249

UNITED STATES PATENT OFFICE.

JAMES WORLEY SMITH, OF CLARINDA, IOWA.

STOCK WATERER.

Application filed December 6, 1923. Serial No. 678,920.

*To all whom it may concern:*

Be it known that I, JAMES WORLEY SMITH, a citizen of the United States, residing at Clarinda, in the county of Page and State of Iowa, have invented a new and useful Stock Waterer, of which the following is a specification.

This invention relates to a stock watering device, which is adapted to be attached to any water supply or storage tank, to be automatically operated so as to control the discharge of water from the same into a watering trough, and to maintain a sufficient supply of water in the latter for the purpose stated.

The general object of the invention is to provide a device of this kind, which is simple and inexpensive in its construction and reliable in its operation, which will maintain the water supply in a sanitary condition, and will permit the trough to be easily cleaned without disturbing the water in the tank.

The invention has been devised also with a view to utilizing the pressure within the tank to maintain the valve tightly closed and to prevent leakage, except when the valve is opened to admit a supply of water to the trough, and the pipe leading from the tank is normally empty, so that no damage or inconvenience is caused by freezing weather.

The specific details of construction and the principles of the invention will be more fully described with reference to the accompanying drawing, in which—

Figure 1 is a vertical section through a tank and trough showing the controlling device in elevation, and in position to permit the flow of water from the tank to the trough.

Figure 2 is a view similar to Figure 1, but with the valve closed.

Figure 3 is a plan view of the invention.

Figure 4 is a perspective view of the balance arm detached.

Figure 5 is a detail perspective view of the bracket for supporting the balance arm.

The invention is shown in connection with a supply or storage tank 6, having an outlet nipple or pipe 7 secured near its bottom, and with its discharge end overhanging a trough 8, in which a limited amount of water is to be maintained for watering hogs or other stock. At the upper end of the tank 6, at the side adjacent the trough 8, a bracket 9 is secured by means of bolts 10 or the like, and has its upper end in the form of a fork projecting above the side of the tank and provided with one or more pairs of opposed holes 11 for supporting a pivot pin or bolt 12.

The balance arm, which is shown in detail in Figure 4, comprises a curved upper portion 13 provided with one or more holes 14, adapted to receive the pivot pin or bolt 12. At one end, the curved portion 13 is extended downwardly to form a comparatively short arm 15, which is substantially vertical when in operative position, and terminates at its lower end in a flat portion 16, having one or more holes 17 adapted to receive a bolt 18, by means of which a valve 19 is secured to the arm. This valve is substantially circular in shape and provided with a suitable facing or gasket 20 of leather or the like, which is adapted to cover the inner end of the nipple or pipe 7 and prevent water from the tank 6 passing therethrough, except when the valve is opened for that purpose. The other end of the curved portion 13 is extended at an angle of about 30° to the arm 15, and is long enough to reach below the top of the trough 8. The lower end of the arm 21 terminates in an outwardly bent flat portion 22, which has a float 23 secured thereto by means of a bolt 24 or the like.

The storage tank 6 is located in proximity to the trough 8, but is ordinarily of sufficient height to prevent the stock from reaching the water therein. A plurality of holes 11 are preferably provided, so that the balance arm may be adjusted vertically as may be necessary to bring the valve 19 into registry with the inner end of the pipe 7, and a plurality of holes 14 may be provided, so that the balance arm may be adjusted laterally and obtain the proper balance to overcome the pressure of the water in the tank 6 and open the valve whenever the level of the water in the trough is near the bottom of the float 23, but in any case the float must have sufficient buoyancy to raise the extension 21 of the arm as the water in the trough approaches the top of the float, and thereby to close the valve. Thus, it will be seen that when the water in the trough 8 reaches a predetermined minimum level, the valve will be opened, as shown in Figure 1, and will be closed again, as shown in Figure 2, when the water in the trough reaches a predetermined maximum level. When in closed position, the pressure of the water in the tank 6 will be exerted upon the valve to maintain the same tightly closed. Normally, the pipe 7 is empty, and consequently may be used in freezing weather without becoming stopped up or damaged. The water within the tank 6 may always be kept in a sanitary condition, while the trough 8 may be easily cleaned as often as necessary. When the trough 8 is to be cleaned, or any repairs made to the device, the outlet pipe 7 may first be plugged up in any suitable manner, so that it will not be necessary to empty the supply tank, but water may be drawn from the latter as desired.

It is also to be noted that the water passes from the tank 6 to the trough 8 by gravity, and its control is entirely automatic. The water in the trough can not in any way mingle with the supply of water in the tank, so that the latter is always clean, and there is no waste.

While I have shown and described in considerable detail the various features of the invention, it will be understood that this is merely for the purpose of illustration, and that various modifications may be made in the size, shape and arrangement of the various parts without sacrificing any of the salient features of the invention as expressed in the claims.

What is claimed is:

1. In a stock watering device, the combination with a trough, of a storage tank adjacent thereto and having an outlet pipe discharging into the trough, a balance arm having an intermediate curved portion with the ends thereof extended in divergent relation, one being longer than the other, means for pivotally supporting the arm at its curved portion on the tank, one end of the arm extending into the tank and provided with a valve for covering the end of the pipe, the other end being provided with a float disposed within the trough.

2. In a stock watering device, the combination with a trough, of a storage tank adjacent thereto and having an outlet pipe discharging into the trough, a balance arm having an intermediate curved portion with the ends thereof extended in divergent relation, one being longer than the other, means for pivotally supporting the arm at its curved portion on the tank, one end of the arm extending into the tank and provided with a valve for covering the end of the pipe, the other end being provided with a float disposed within the trough, means for adjusting the arm with respect to its fulcrum to change its balance, and means for bodily adjusting the arm vertically.

In testimony that I claim the foregoing as my own I have hereto affixed my signature.

JAMES WORLEY SMITH.